March 31, 1953 R. F. WILLS 2,633,355
STRIP FEEDING MECHANISM FOR PHOTOGRAPHIC
COPYING APPARATUS
Filed July 6, 1948 4 Sheets-Sheet 1

INVENTOR.
Richard F. Wills
BY
ATTORNEY.

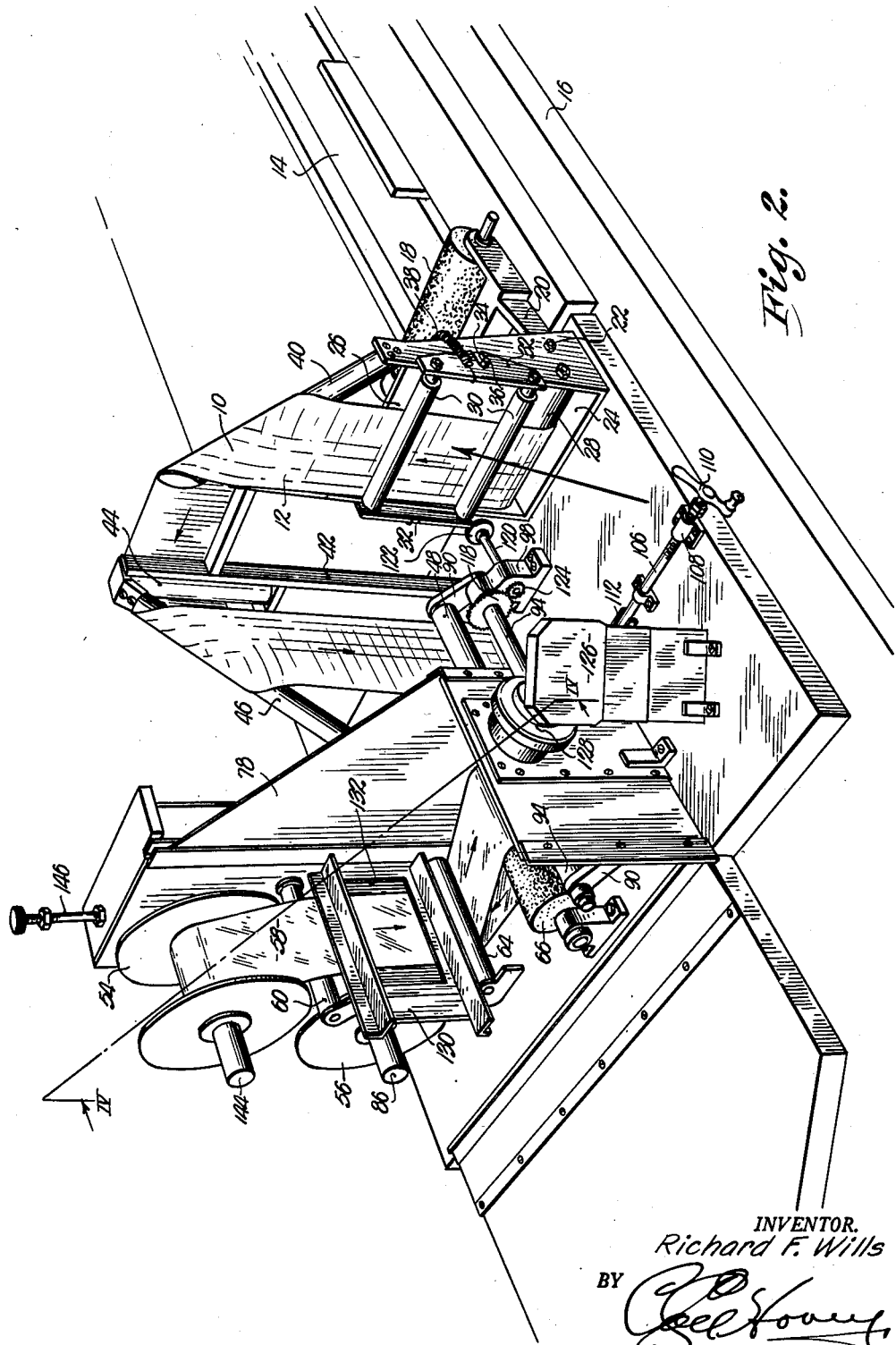

March 31, 1953  R. F. WILLS  2,633,355
STRIP FEEDING MECHANISM FOR PHOTOGRAPHIC
COPYING APPARATUS
Filed July 6, 1948  4 Sheets-Sheet 3
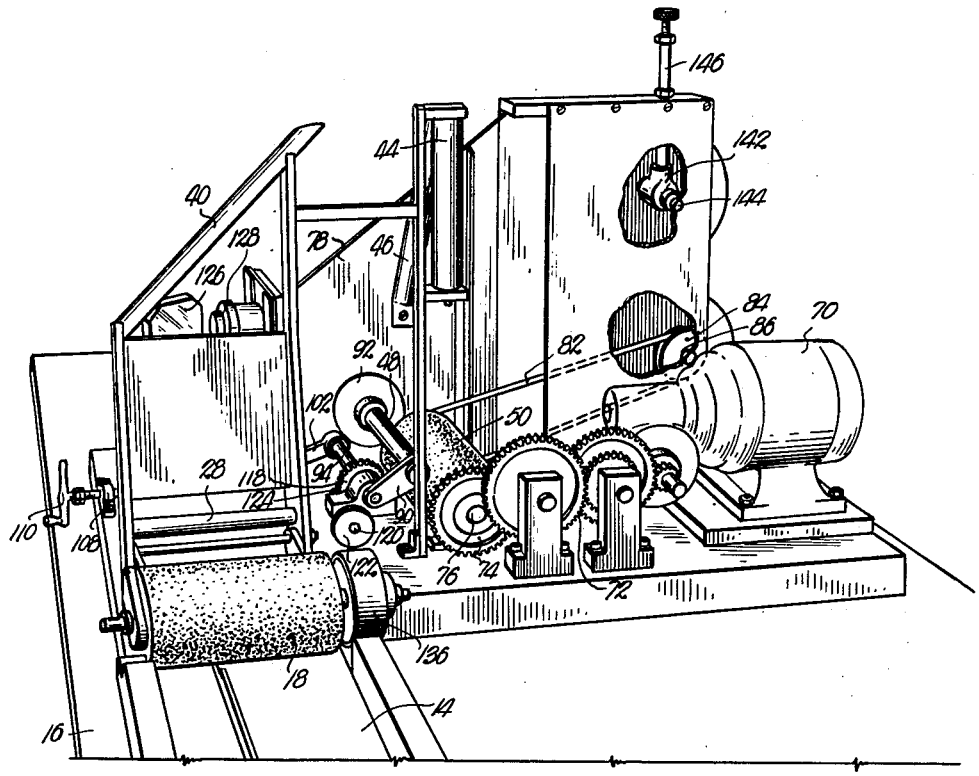
Fig. 3.
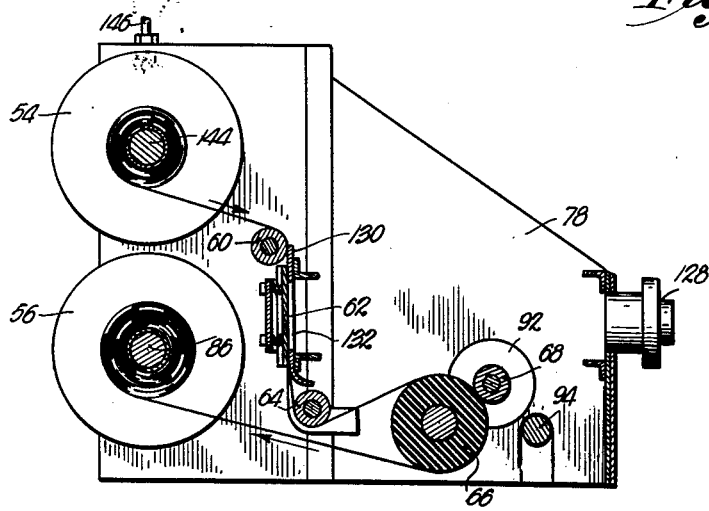
Fig. 4.
INVENTOR.
Richard F. Wills
BY
ATTORNEY

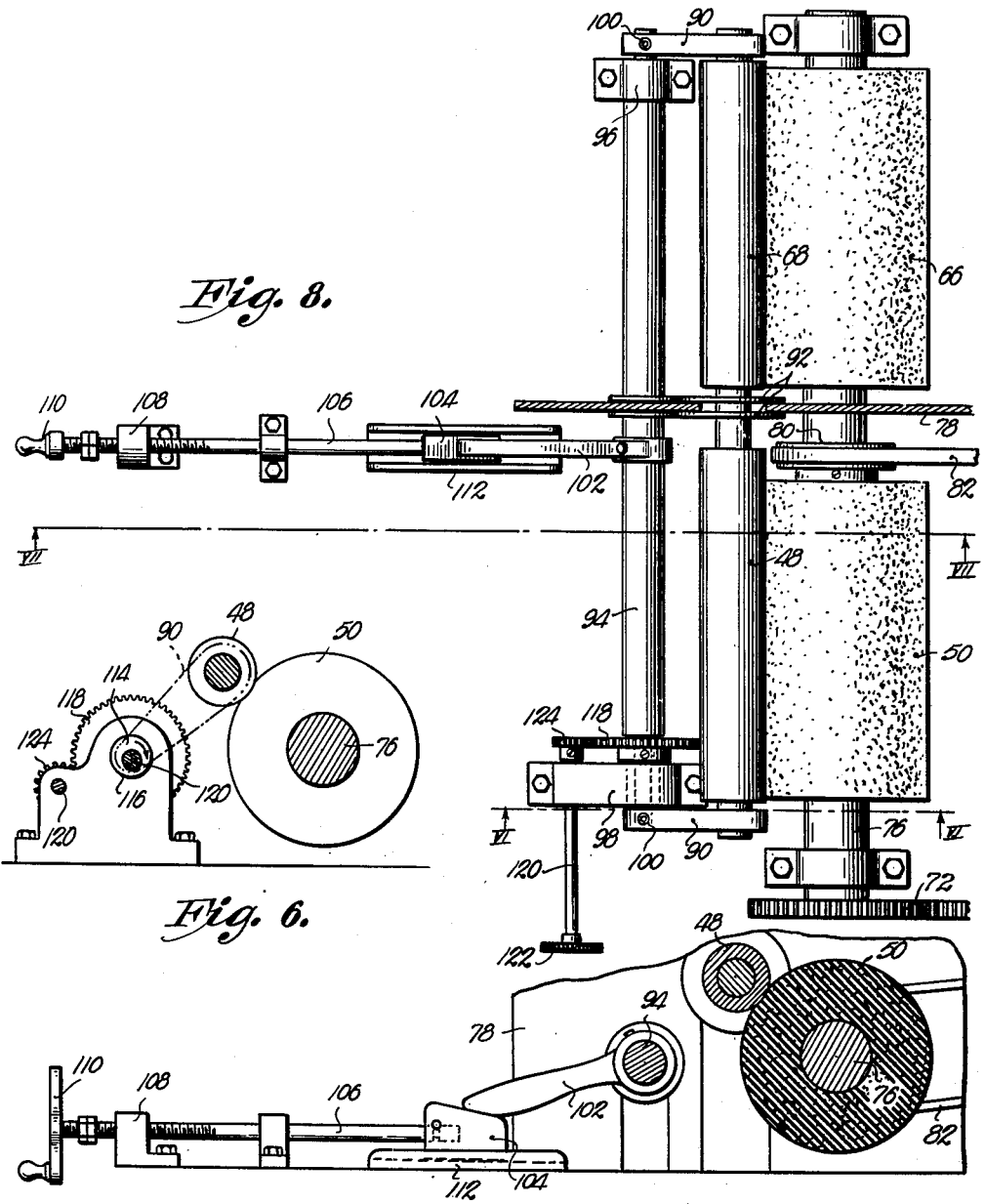

Patented Mar. 31, 1953

2,633,355

UNITED STATES PATENT OFFICE 2,633,355

STRIP FEEDING MECHANISM FOR PHOTOGRAPHIC COPYING APPARATUS

Richard F. Wills, Miami, Okla., assignor to Color Research, Inc., Miami, Okla.

Application July 6, 1948, Serial No. 37,275

4 Claims. (Cl. 271—2.3)

This invention relates to the field of photography and more particularly to apparatus for reproducing images from an original strip, the primary object being to provide means for continuous reproduction of copies of lengthy records, particularly of the type having varying colors thereon and requiring precise and accurate transfer.

It is common practice in the petroleum industry to make accurate charts in color of all important oil wells or other drilled holes passing through strata of differing characters to the end that a permanent record may be kept of the differing types of soil, rock and other elements forming the walls of the well throughout its depth. The chart is formed on an elongated strip of sheet material graduated longitudinally in feet with the differing strata indicated thereon in various colors. Since such colors are highly important in reading the chart, the methods heretofore used of reproducing such chart, while maintaining the colors originally placed thereon, has been tedious and time consuming.

Accordingly, the most important object of this invention is the provision of a photographic apparatus capable of receiving the elongated original chart and moving the same through a substantially rectilinear path of travel while simultaneously moving a film strip or other transfer strip to the end that reproduction can be easily and quickly accomplished through interpositioning of a lens and a reflector between the two moving strips.

Another important object of this invention is the provision of a photographic apparatus of the above mentioned character having common means for driving the two strips in synchronization, said means being provided with manually adjustable means for providing a speed differential between the two strips to the end that compensation is provided for shrinkage of the transfer strip after the image has been reproduced thereon.

Another important object of this invention is to provide a photographic apparatus having common drive means for the strip having images thereon and the transfer strip upon which said images are to be reproduced, said driving means being provided with structure for rendering the same more effective upon one of the strips than the other as desired by the operator, all to the end that a speed differential in the strip movements is provided.

Other objects of this invention relate to details of construction and particularly to the precise manner of providing pairs of opposed rollers for receiving and moving the two strips, one roller of each pair having common means for holding the same in clamped relationship to the opposed rollers respectively and additional means independent thereof for shifting one of the rollers more tightly against its opposed roller, the opposed rollers being of compressible material to the end that the effective area thereof is decreased by operation of the shifting means.

Other objects will be made clear or become apparent as the following specification progresses, reference being had to the accompanying drawing, wherein:

Fig. 2 is a top perspective view thereof, parts of the cabinet being displaced to reveal details of construction.

Fig. 3 is a perspective view showing one end of the apparatus opposite to that illustrated in Fig. 2 but without the strip of material 10.

Fig. 4 is a fragmentary transverse cross sectional view taken on line IV—IV of Fig. 2.

Fig. 6 is a transverse cross sectional view taken on line VI—VI of Fig. 8.

Fig. 7 is a fragmentary cross sectional view taken on line VII—VII looking in the direction of the arrows; and Fig. 8 is a top plan view of the actuating assembly for the strips, said Fig. 8 being partially in section and partially schematic.

Figure 1:
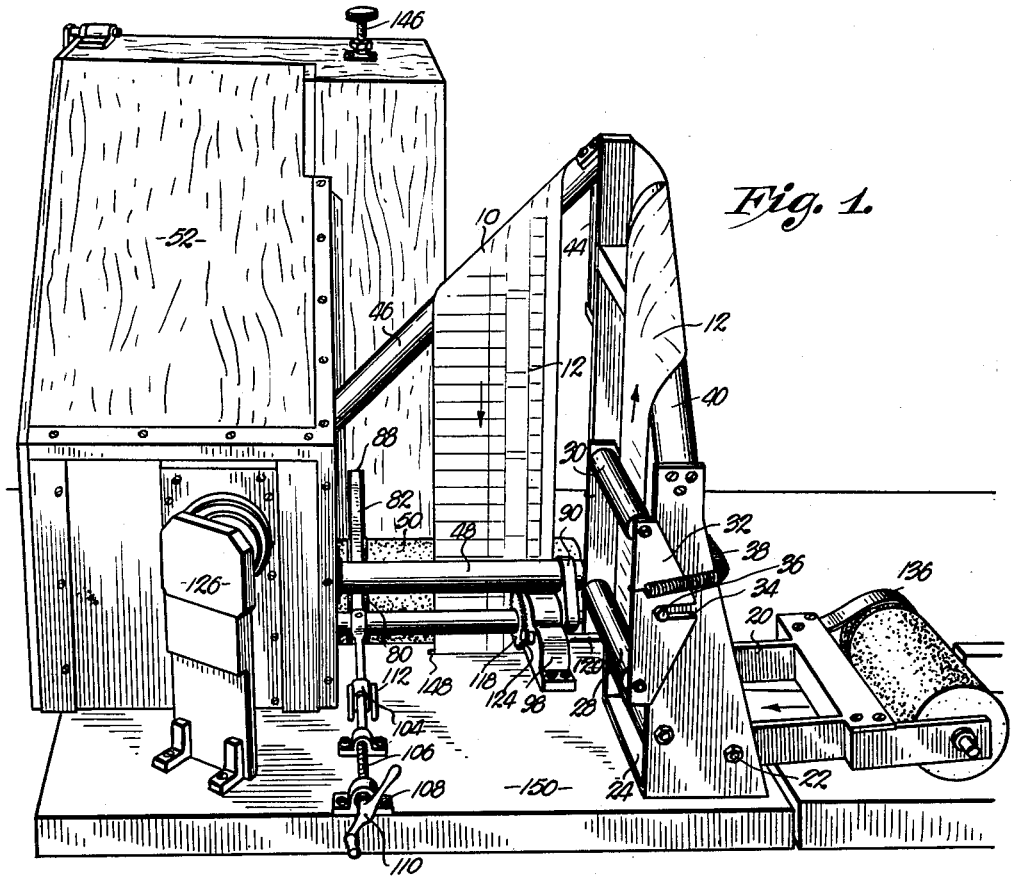
Fig. 1 is a normally front elevational view of photographic copying apparatus made in accordance with the present invention.

In Fig. 1 an elongated strip of material, broadly designated by the numeral 10, is shown operably threaded in the photographic apparatus forming the subject matter of this invention. As above stated, this original strip 10 is graduated as at 12 indicating the depth of the well in feet and having the earth strata indicated thereon in colors between the spaces set forth by such graduations 12. Suitable indicia is also printed upon one face of this strip 10 as explanatory of certain conditions of the particular well thus recorded.

Strip 10 is originally disposed face downwardly within an elongated flat channel 14 disposed horizontally upon a table or other supporting surface 16. From the channel 14, strip 10 passes beneath a roller 18 bearing against strip 10 by its own initial weight. This roller 18 is mounted for vertical swinging movement by means of a pair of spaced apart arms 20 pivotally secured at their outermost ends as at 22 upon an upstanding substantially U-shaped bracket 24.

A flat vertical plate 26 is disposed between the legs of bracket 24 in spaced relationship above the bight of bracket 24 and strip 10 is threaded beneath plate 26 and upwardly along one face of the plate 26 opposite to roller 18. After passing beneath plate 26, the strip 10 passes over an idler roller 28 and beneath a pair of spaced apart rollers 30. The roller 28 is rotatably disposed between the legs of the bracket 24 whereas rollers 30 are held in spaced apart relationship by a pair of flat spaced plates 32. These plates are disposed on the outermost faces of the proximal legs of bracket 24 and are slotted as at 34 for receiving an out-turned pin 36 on bracket 24.

A spring 38 has its ends hooked over both of the plates 32 and is looped around the bracket 24. It is thus seen that the spring 38 operates to not only hold the two plates 32 in place upon the bracket 24 with the pins 36 receiving the respective slots 34 but also serves in holding the two rotatable rollers 30 tightly against the strip 10 with the latter clamped against one face of plate 26. The face of strip 10 having graduations 12 and indicia thereon is thus disposed outwardly with respect to plate 26 as such tape 10 progresses upwardly in a vertical path of travel from roller 28. From the uppermost of the rollers 30 mounted between the plates 32, tape 10 passes over an inclined rod 40 horizontally around an upstanding frame piece 42 around a vertical roller 44 mounted upon the frame 42 and thence over a second inclined rod 46. From the rod 46, tape 10 travels downwardly in a substantially vertical path of travel where the same is received between a pair of rollers 48 and 50 shown more specifically in Figs. 6 to 8 inclusive.

As indicated in Fig. 1 of the drawings, a closed light-proof cabinet, broadly designated by the numeral 52, has rotatably mounted therein a pair of reels 54 and 56 for receiving a film or other transfer strip 58 upon which the images from tape 10 are to be reproduced. This strip 58 is originally wound upon the reel 54 and travels in the manner about to be described to the take-up reel 56.

It is clear as shown in Figs. 2 and 4, that these two reels 54 and 56 are mounted for rotation upon substantially parallel horizontal axes, the tape 58 passing downwardly from reel 54 over an idler roller 60 in front of a pressure plate 62 and thence downwardly over a roller 64.

As illustrated in Fig. 4 of the drawings, the rollers 60 and 64 are mounted on horizontal axes, both of which are substantially parallel to the axes of rotation of reels 54 and 56. From the roller 64, tape 58 travels horizontally and is looped about a roller 66 (see Fig. 8), which roller 66 has a corresponding opposed roller 68. Fig. 4 of the drawing illustrates the way in which tape 58 passes from the roller 66 rearwardly to wind about reel 56 after passing beneath the roller 64.

Means for driving certain of the rollers thus far described is clearly indicated in Fig. 3 of the drawing and includes an electric motor or the like 70 having worm gear (not shown) attached to its drive shaft. Such worm gear is in mesh with one of a plurailty of a train of reduction gearing broadly designated by the numeral 72 and interconnecting the drive shaft for motor 70 with roller 50.

A gear 74 forming a part of the train of gears 72 is mounted directly upon a shaft 76 that mounts both of the rollers 50 and 66 (Fig. 8) and passes through one wall 78 of the cabinet 52. It is thus seen that the roller 50 is disposed exteriorly of the cabinet 52 whereas roller 66 is within the cabinet 52.

A pulley 80 mounted directly upon the shaft 76 and rotatable therewith is disposed exteriorly of cabinet 52 (Fig. 1) and a belt or the like 82 interconnects this pulley 80 with a sheave 84 within cabinet 52 and mounted directly upon a shaft 86 for take-up reel 56, belt 82 passing through a slot 88 in cabinet 52. It is thus seen that the only rollers having a positive drive from motor 70 are rollers 50 and 56 and the only reel that is driven directly is reel 56 mounted upon shaft 86.

Referring now more particularly to Figs. 6 to 8 of the drawings, as above described, original tape 10 passes downwardly between the rollers 48 and 50 while the tape 58 passes between the rollers 66 and 68. The two rollers 50 and 56 are provided with a suitable covering to present a frictional engagement between such rollers and the respective tapes, whereas rollers 48 and 68 are mounted for free rotation on a pair of spaced apart laterally extending arms 90.

It is understood that the two rollers 48 and 68 may be either mounted upon an elongated shaft or have a portion intermediate their ends reduced as indicated in Fig. 8 for passing through the partition wall 78 for cabinet 52. Shields 92 circumscribe such portion between the rollers 48 and 68 to maintain the cabinet 52 impervious to light and to permit free swinging movement of the rollers 48 and 68 as will be presently set forth.

An elongated shaft 94 disposed horizontally and substantially parallel to the axes of rotation of rollers 48, 50, 68 and 66 has its ends reduced and rotatably mounted within a pair of spaced apart bearings 96 and 98. Such reduced ends of the shaft 94 extend outwardly beyond the respective bearings 96 and 98 for receiving one end of the arms 90 opposite to that end thereof receiving the rollers 48 and 68. These arms 90 are secured directly to the shaft 94 by set screws or the like 100.

A laterally extending arm 102 secured directly to the shaft 94 intermediate the ends thereof as indicated in Fig. 7, terminates at its outermost free end in the path of travel of a cam member 104. This cam 104 is joined directly to one end of a screw 106 threaded at its opposite end within a tapped bracket 108.

A manually manipulatable crank 110 on the outermost free end of the screw 106 permits rotation of such screw 106 to move the cam 104 toward and away from the arm 102. A guide 112 is provided for the cam 104.

It is clear from the foregoing that as the screw 106 is rotated in a direction to cause cam 104 to shift toward the shaft 94, arm 102 which is contacted by cam 104 will be caused to swing upwardly. Such upward swinging movement of the arm 102 causes rotation of the shaft 94 with a consequent downward swinging movement of the arms 90 and also a movement of the two rollers 48 and 68 simultaneously toward the corresponding opposed rollers 50 and 66 respectively. The extent of pressure of rollers 48 and 68 against their corresponding strips 10 and 58 respectively, is governed entirely by the extent of movement of cam 104 toward the shaft 94. Since the rollers 48 and 68 are thus moved together as a unit, the pressure exerted against their respective tapes against rollers 50 and 66 respectively, will be ordinarily substantially the same. Such tapes 10 and 58 will then move at substantially the same rate of speed. This is unsatisfactory, however, because of the fact that the sensitized material from which the tape is made will ordinarily stretch while the same moves from the reel 54 to the reel 56 with a resultant shrinkage after the image from tape 10 has been projected thereon. Furthermore, a slight shrinking always takes place when the film strip 58 is subsequently processed. Accordingly, it is absolutely essential that there be a differential between the speeds of travel between tapes 10 and 58 and means is provided to decrease the effective area of roller 50 for tape 10 to the end that the latter travels at a slightly slower speed than the speed of travel of tape 58. Such means includes a sleeve 114 circumscribing the reduced end of shaft 94 adjacent bearing 98 and eccentrically disposed relative thereto as clearly indicated in Fig. 6 of the drawing.

This sleeve 114 serves as a bearing for the shaft 94 and is freely rotatable within an opening 116 in bearing 98. The innermost end of this sleeve 114 has secured thereto a gear 118, said gear 118 having no connection whatsoever with shaft 94.

A pin 120 having a knurled knob 122 on one end thereof passes through the bearing 98 in substantial parallelism with the axis of rotation of shaft 94 and has a pinion 124 on that end thereof opposite to knob 122 that is in mesh with the relatively large gear 118.

Rotation of the pin 120 causes rotation of the sleeve 114 with a resultant movement of the proximal end of shaft 94 together with the roller 48 toward and away from roller 50 independently of the operation of cam 104 and the centrally-disposed laterally projecting arm 102. It is realized that such movement of the shaft 94 by operation of pin 120 also causes a slight movement of roller 68 toward and away from its opposed roller 66 but this last-mentioned movement is only slight and it is definitely possible to reduce the effective area of roller 50 through use of the structure operated by rotation of pin 120. Since the movement of shaft 94 and roller 48 is only slight, a slightly loose fit within bearing 96 for shaft 94 is all that is necessary to permit such movement. Roller 50 is made from rubber or other compressible material and, therefore, as shown in Fig. 7, inward movement of roller 48 toward roller 50 will press the latter inwardly to an extent dependent on the position of eccentric 114 and bearing 98.

As indicated in Fig. 2 of the drawings, the substantially vertical path of travel of tape 58 adjacent the pressure plate 62 and the rectilinear vertical path of travel of tape 10 along one face of plate 26 are substantially parallel. In other words, at these two points, the tape 10 and the tape 58 have their longitudinal axes in parallelism but their transverse axes are perpendicular. Accordingly, in order to transfer the image between rollers 30 that is imprinted upon one face of the tape 10 to that portion of tape 58 adjacent pressure plate 62, it is necessary to provide an upstanding reflector in the nature of a mirror or the like 126. Fig. 2 is clear to the effect that this mirror 126 is disposed at an angle displaced substantially 45 degrees with respect to both tapes 10 and 58. The image from tape 10 is thus reflected by the mirror 126 into a lens 128 mounted upon one face of the cabinet 52 with its longitudinal axes perpendicular to tape 58 and in alignment with that portion thereof disposed along the pressure plate 62.

It is noted in Fig. 4 of the drawings that a framework 130 has a polygonal opening 132 formed therein to frame the tape 58 as it passes downwardly along the pressure plate 62. Through use of the mirror 126, the images from tape 10 are transferred to the tape 58 without the usual reversing thereof as is present with the usual type of camera.

Figure 5:
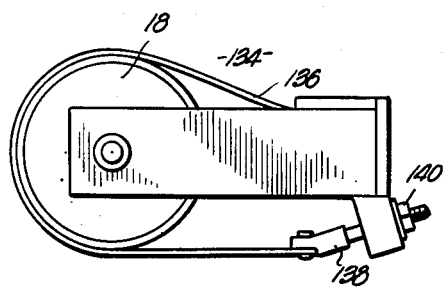
Fig. 5 is an enlarged detailed end elevational view of the retarding means for the original strip from which images are to be reproduced.

To the end that the tape 10 is held tightly between the initial receiving roller 18 and the pair of opposed rollers 48 and 50 therefor, a brake broadly designated by the numeral 134, is provided for roller 18. This brake 134 illustrated in Fig. 5 of the drawing, constitutes a flexible band 136 looped about a portion of the roller 18 and having one end thereof secured directly to the supporting framework of the roller 18. The opposite end of the flexible band 136 is secured directly to a bolt 138 having a nut 140 for manually increasing and decreasing the tension which this band 136 applies to the roller 18. Similarly, Fig. 3 of the drawings, details the means for yieldably holding the reel 54 against free rotation and thereby maintaining tape 58 tightly stretched between such roller 54 and the roller 56. Such means includes a collar 142 threaded about a shaft 144 for the reel 54 and a vertical pin 146.

Pin 146 extends upwardly through the cabinet 52 and projects into the collar 142 for frictional engagement with the shaft 144. This pin 146 is adjustable vertically and any suitable means may be provided at the innermost end thereof within the collar 142 for yieldably holding a plug or the like of frictional material against the shaft 144.

Inasmuch as the original tape 10 has colors thereon for indicating the different types of earth strata forming the oil well, suitable emulsions are applied to the tape 58 to the end that the finished copy may be developed in the precise colors appearing on he original tape 10. After the entire length of tape 10 has been exposed and projected to the tape 58, the same may be again directed through its path of travel since such tape passes downwardly from the opposed rollers 48 and 50 therefor through a slot 148 formed in a base 150 for the entire apparatus which rests upon the table top 16.

Manifestly, all the aims and objects initially set forth herein can be attained through use of the apparatus forming the subject matter of this invention and the problem with respect to making a large number of copies of lengthy records and documents, has been solved.

While only one embodiment of the present invention has been illustrated and described, it is understood that all modifications thereof which fairly come within the scope of the appended claims are contemplated hereby.

Having thus described my invention, what I claim as new and desire to secure by Letters Patent is:

1. In photographic copying apparatus, a rotatable shaft; a pair of spaced, primary, resilient rollers mounted on the shaft for rotation therewith, a rotatable control shaft pivoted at one end for swinging movement toward and away from the primary rollers; a number of lateral extensions fixed to the control shaft; a secondary roller for each primary roller respectively rotatably carried by said extensions; a laterally extending arm fixed on the control shaft intermediate the ends thereof; a wedge member reciprocable toward and away from the rollers and engageable with said arm for swinging the secondary rollers toward the primary rollers whereby to clamp sheets of material between the primary rollers and secondary rollers; a rotatable eccentric rotatably receiving the control shaft at the other end of the latter; and means connected with said eccentric for rotating the latter to swing the control shaft and thereby the secondary rollers toward and away from the primary rollers.

2. In photographic copying apparatus as set forth in claim 1, wherein is provided a screw rotatably connected with said wedge member for reciprocating the same, there being a stationary, internally screw-threaded bracket for receiving the screw.

3. In photographic copying apparatus as set forth in claim 1, wherein said means includes a pair of intermeshing gears, one of said gears being connected with the eccentric.

4. In photographic copying apparatus as set forth in claim 1, wherein said means includes a pair of intermeshing gears, one of said gears being connected with the eccentric, and a pin attached to the other gear for rotating the latter.

RICHARD F. WILLS.

REFERENCES CITED

The following references are of record in the file of this patent:

UNITED STATES PATENTS

| Number | Name | Date |
| --- | --- | --- |
| 889,746 | Beckman | June 2, 1908 |
| 1,115,828 | Johnston | Nov. 3, 1914 |
| 1,235,805 | Jennings | Aug. 7, 1917 |
| 1,460,206 | Masland | June 26, 1923 |
| 1,802,530 | Pilny | Apr. 28, 1931 |
| 1,822,902 | Osborne | Sept. 15, 1931 |
| 1,836,691 | Tuttle | Dec. 15, 1931 |
| 2,428,681 | Pratt | Oct. 7, 1947 |